Feb. 5, 1957  B. BOURGEOIS  2,780,137
BAYONET SECURING MEANS FOR OBJECTIVES OF CAMERAS
Filed June 30, 1955

INVENTOR
Benjamin Bourgeois.

BY

ATTORNEY

2,780,137

BAYONET SECURING MEANS FOR OBJECTIVES OF CAMERAS

Benjamin Bourgeois, Ballaigues, Vaud, Switzerland, assignor to Pignons S. A., Ballaigues, Switzerland, a corporation of Switzerland Application June 30, 1955, Serial No. 519,086

Claims priority, application Switzerland July 2, 1954

2 Claims. (Cl. 88—57)

My invention has for its object bayonet securing means, chiefly for the objectives of view-taking cameras. In such securing means, the objective is generally rigid with at least one radial projection adapted to co-operate with the inner edge of a corresponding opening in the casing of the camera so as to ensure the proper securing of the objective on the camera.

The securing means of this type which I have devised in accordance with my invention distinguish from all known means of the same type through the fact that said radial projection or projections are formed on a member detachably fitted on the mount of the objective.

I have illustrated diagrammatically and by way of example in accompanying drawings a preferred embodiment of an arrangement according to my invention.

Figure 1:
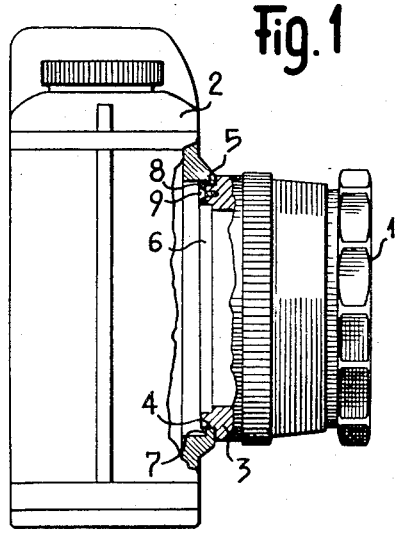
Fig. 1 is a lateral elevational view, partly sectional, of a camera incorporating the securing means according to the invention.

As readily ascertained from inspection of Fig. 1, to fit an objective lens 1 on the body or casing 2 of a photographic view-taking camera 2, through securing means of the bayonet type, the mount 3 of said objective 1 is provided with a part 4 of a reduced diameter, turned on the lathe and adapted to be fitted coaxially inside the inturned flange 5 formed round the opening 6 provided in the casing 2 with a view to carrying the objective mount 3.

In the conventional bayonet securing means, one or more tongue shaped or the like projections are formed radially on the rear end of the mount 3 so as to engage the inner surface 7 of the camera flange 5 surrounding the opening 6. To introduce such projections or tongues inside the opening 6, the flange 5 surrounding the latter is provided with radial openings or notches through which it is possible to introduce said projections as provided by an axial shifting of the objective 1 with its mount 3 into the casing 2. It is sufficient thereafter to make the mount 3 turn through a predetermined angle so as to provide for the engagement of the tongues or projections against the inner surface 7 of the flange 5.

Figure 3:
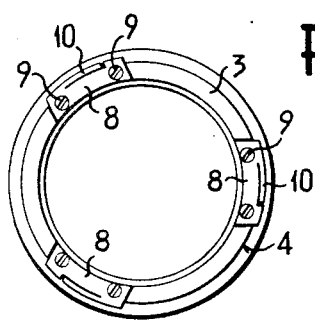
Fig 3 is an end view of the rear surface of the objective.

In the example illustrated the projections or tongues are constituted according to my invention by plates 8 fitted flushly in recesses on the rear end of the mount 3 by screws 9. As shown in Fig. 3, there are provided three small plates 8 which are distributed uniformly along the periphery of the mount 3 and are secured to the latter by means of two such screws 9.

Figure 2:
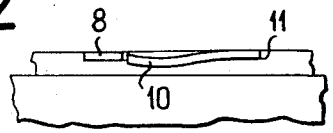
Fig. 2 is a view of a detail thereof on an enlarged scale.

Furthermore, as illustrated in Fig. 3 and also in Fig. 2 which shows on an enlarged scale a fragmental section of the mount carrying one of the plates 8, each of the latter carries an elastic blade 10 cut and shaped so that it may be displaced or bowed out of the general plane of the plate, as clearly shown in Fig. 2.

Thus each blade 10 of a plate 8 is adapted to yieldingly engage the inner surface 7 of the flange 5 surrounding the opening 6 of the camera body so as to ensure a fit without any play of the objective 1 inside the casing 2.

This bayonet type securing means show various advantages when compared with similar arrangements proposed hitherto. As a matter of fact since the projections including possibly blades such as 10 form members 8 fitted detachably on the mount 3, said projections and/or blades 10 may be made of steel having a perfect resiliency while the mount itself is made for instance of a light alloy. On the other hand if, as a consequence of some mishap, one of the blades 10 were to break or to be torn off, it would be an easy matter to substitute for the plate 8 another one without it being any longer necessary, when doing so, to change the entire mount 3 of the objective.

Furthermore, my novel structure devised for the bayonet securing means, including detachable plates, simplifies the machining of the mount 3, since the latter required generally hitherto a number of expensive cutting operations for the execution of each projection.

Numerous modifications may be provided for the bayonet securing means described hereinabove. It is possible for instance to provide each objective with one, two or more than three plates 8 fitted on the mount 3. As a further modification, all the plates 8 may be integral with one another and form a complete annulus secured by means of screws 9 to the rear end of the mount 3. In this case it would no longer be necessary to provide in the rear end of said mount recesses as shown at 11 in Fig. 2 for fitting the corresponding plates inside the mount.

In the preceding description referring to accompanying drawings, the bayonet securing means have been illustrated as applied to a view-taking camera. However it is obvious that my improved securing means of the bayonet type may be incorporated into any apparatus in which such securing means are conventionally used.

What I claim is:

1. An arrangement for securing an objective lens mount inside a camera opening provided with a radially slotted inturned flange, comprising, arcuate plates detachably secured at equidistantly spaced intervals to the periphery of said mount and for entering a corresponding radial slot in the flange to be angularly shifted with said mount about its axis into registery with the rear surface of said flange, an elastic blade formed from the outer edge portion of each plate, said blade extending slightly forwardly of the corresponding plate and adapted to yieldingly engage the rear surface of said inturned flange.

2. An arrangement for securing an objective lens mount inside a camera opening provided with a radially slotted inturned flange, according to claim 1, wherein, the rear end of the lens mount is radially recessed, and said plates are removably fitted in the corresponding recesses of the lens mount to be flush with the inner face thereof.

References Cited in the file of this patent

UNITED STATES PATENTS

| | | |
|---|---|---|
| 2,052,261 | Verschoor | Aug. 25, 1936 |
| 2,136,149 | Nuchterlein | Nov. 8, 1938 |
| 2,260,991 | Gorey | Oct. 28, 1941 |
| 2,496,928 | Bing et al. | Feb. 7, 1950 |
| 2,618,201 | Brohl et al. | Nov. 18, 1952 |
| 2,649,024 | Goldhammer | Aug. 18, 1953 |